3,749,799
STABLE DRY VITAMIN A PREPARATIONS
Winifred Cort, Little Falls, and Harold Leon Newmark, Maplewood, N.J., assignors to Hoffmann-La Roche Inc., Nutley, N.J.
No Drawing. Filed Feb. 4, 1972, Ser. No. 223,695
Int. Cl. A61k 15/04
U.S. Cl. 424—344  12 Claims

ABSTRACT OF THE DISCLOSURE

A vitamin A active substance particularly vitamin A acetate, is provided in a dry form which is stable under conditions of high humidity and acid pH.

BACKGROUND OF THE INVENTION

The problem of instability of the various forms of vitamin A has long been recognized in the art of pharmaceutical compounding. All vitamin A active substances are subject, in varying degrees, to oxidative destruction particularly under conditions of high humidity and temperature. This instability is usually more pronounced where the above conditions are present in combination with an acidic pH. This instability has in the past presented a major problem inherent in the incorporation of vitamin A active substances in certain products wherein, because of moisture content, pH, etc., such substances are inactivated. A prime example of such a product is fortified feed mash which is produced for feeding to domestic animals. A typical commercial livestock mash product is usually ground corn meal and nutrients and has a pH of about 4.5 to 5.5 and a moisture content of from about 10% to 13%. These conditions work to rapidly deactivate vitamin A active substances present therein, particularly where conditions of storage have caused the temperature of the mash to rise somewhat.

There have been numerous attempts to solve the problem of instability of vitamin A active substances in feed mash preparations. For example, one such method was to encase the vitamin A active substance in a matrix of a film-forming substance such as gelatin to form a beadlet. This method suffers from the disadvantage that the solubility of such beadlets or microcapsules in water frees the vitamin A active substance from its protective shield and it is thereafter rapidly deactivated. It has also been common in such preparations to use the most stable form of vitamin A commonly available, i.e., vitamin A palmitate in preference to the more active but much less stable vitamin A acetate. The use of vitamin A palmitate, even though more stable than the acetate, is disadvantageous for economic reasons as it is more expensive to produce than the acetate.

In accordance with the present invention, the problems discussed above have been overcome by the discovery of a method whereby a stable, dry form of a vitamin A active substance may be produced. The products of the invention are water-insoluble and stable to humidity and acid pH. More particularly, the present invention affords a method whereby vitamin A acetate is stabilized so that it can be utilized in the preparation of fortified animal feed mash. In addition, the stability of the dry vitamin A active preparations enables them to be successfully incorporated into cosmetic preparations which in most instances contain water. As with animal feed mash, the present invention affords a method whereby vitamin A acetate may readily be incorporated into cosmetic preparations such as creams, ointments and the like.

DETAILED DESCRIPTION OF THE INVENTION

In accordance with the present invention, a water-insoluble, stable dry form of a vitamin A active substance is provided by a unique process for enveloping said substance in a matrix containing calcium pectate wherein the calcium pectate is formed in situ. In the practice of the invention, the vitamin A active substance is first combined with suitable antioxidants and preservatives and formed into an oil/water emulsion with water-dispersible gelatin. The resulting homogeneous emulsion is combined with a solution of pectin previously adjusted to a pH of about 8.5 with a suitable base. To the resulting emulsion is then added an aqueous solution of a water-soluble calcium salt, e.g., calcium chloride. The emulsion which results is then sprayed into a heated atmosphere to form a powder or made into beadlets by spraying into a fluidized collection bed comprising a starchy powder at a very low temperature whereby a permanent solid particulate product is established. Exemplary of a suitable method of the latter type is the procedure described in U.S. Pat. No. 2,756,177, issued July 24, 1956. During the drying operation, calcium pectate is formed in situ and sets into the gelatin matrix. The product, in either powder or beadlet form, is stable and insoluble in water but readily assimilable in intestinal juice wherein the pH is above 7.0.

The precise method or device which is utilized to convert the emulsion of the invention into liquid droplets and to introduce the droplets into a heated atmosphere or into a suitable collection bed is not critical to the operability of the invention. It is essential, however, that the droplets be kept physically separate until their particulate form is permanently established. Conveniently, this is accomplished by spraying the emulsion from a moving or fixed nozzle into the desired media. Where the vitamin A active material containing emulsion has been formed into beadlets by spraying into a cooled, starchy powder such as described in U.S. Pat. 2,756,177, a separation of the product from the collection bed is effected, for example, by screening. Where it is desired to utilize an inert liquid collection bed, separation of the product can be effected by means of filtration, centrifugation or other means and the washing and drying of the product can be then carried out by conventional procedures.

In accordance with the invention the terminology "vitamin A active substance" indicates any substance recognized in the art as having vitamin A activity. Examples of such substances include vitamin A alcohol, vitamin A esters, preferably synthetic fatty acid esters such as the acetate and palmitate and the like. The preferred embodiment of the invention contemplates the use of vitamin A acetate.

The gelatin utilized in the practice of the present invention is low bloom gelatin, i.e., 50–100 bloom. A gelatin which is representative of those gelatins which are useful in the practice of the present inpention is KK low bloom gelatin manufactured by Kind & Knox Co. of Camden, N.J. While this gelatin is representative of those gelatins useful herein, the present invention is, of course, in no way limited to the use of a particular low-bloom gelatin.

The type of pectin which is utilized in the practice of the invention is not particularly critical. Any commercial grade of pectin which meets the standards of purity recognized in good pharmaceutical manufacturing practices is acceptable.

The calcium salt utilized in the formation of calcium pectate in accordance with the invention can be any organic or inorganic water-soluble calcium, e.g., the chloride, the bromide, the carbonate, the acetate and the like. Of these, calcium chloride is preferred.

The choice of the base utilized in adjusting the pH of the emulsion formed in accordance with the invention is made in view of the type of product form, i.e., powder or beadlets. For the production of beadlets, any conventional inorganic or organic base may be utilized which does not otherwise interfere with the formation of the beadlets such as, for example, triethylamine, alkali metal hydroxides or carbonates and the like. Wherein the emulsion is to be spray dried to form a powder, a volatile base is preferred. Of such bases recognized in the art, the ammonium salts are preferred, particularly ammonium hydroxide, due to being readily available and physiologically acceptable.

The stable, water-insoluble product of the invention may vary rather widely in content of vitamin A active material. Generally, however, the finished dry product contains from about 1 to about 45% by weight vitamin A active material, preferably from about 10 to about 35% by weight. In the preferred embodiment of the invention utilizing vitamin A acetate, these percents represent a vitamin A activity of from about 30,000 to about 1.2 million International units of vitamin A activity, preferably from about 200,000 to about 1 million units per gram of finished product. The finished product also contains from about 15 to 50% by weight, preferably from about 20 to about 30% by weight gelatin. Further, the finished product contains from about 0.5% to about 10.0% by weight, preferably from about 1.8 to about 4.0% and most preferably from about 2.2% to about 2.5% calcium pectate. In addition, the finished product contains from about 1% to about 40% of a plasticizer, preferably from about 15% to about 30% by weight. The plasticizers, which are optional but preferred ingredients, are those commonly utilized in gelatin compositions of fat-soluble vitamins, such as pharmaceutically acceptable polyhydric alcohols, e.g., sorbitol, corn syrup, invert sugar, sucrose, dextrin and the like. Of these, sucrose is preferred. Another optional but preferred ingredient is an antioxidant. The antioxidant is usually present in from about 1% to about 8% by weight and may be one or more of those oil-soluble compounds commonly recognized in the art, e.g., butylated hydroxyanisole, butylated hydroxytoluene, mixed tocopherols, ethoxyquin, propyl gallate or the like. Finally, the finished dry vitamin A acetate of the invention can contain such optional agents as preservatives, extenders, buffering agents, coloring agents and the like.

In the practice of the invention, the vitamin A active material is homogenized with the gelatin, plasticizers, antioxidants and the like, if present. The resulting emulsion is then adjusted to a slightly alkaline pH, e.g., about 8–9 with a suitable base and homogenized to a dispersed particle size of from 1–5 microns, preferably 1–3 microns. To this emulsion is then added the pectin as an aqueous solution in sufficient boiling water to completely dissolve it. The pH of the pectin solution is also adjusted to slightly alkaline with a suitable base. To the resulting emulsion is added an aqueous solution of a water-soluble calcium salt the pH of which had previously been adjusted to about pH 8–9. The emulsion is then spray dried to form a powder or beadlets, depending on the process utilized and the type of product desired. The resulting product is then isolated by conventional procedures and dried to yield a stable dry vitamin A active product which is stable to high humidity and acid pH and is especially suitable for incorporation into moist cosmetic preparations and animal mash feed formulations.

The following examples serve to further illustrate the invention.

EXAMPLE 1

A total of 120.0 parts by weight KK low bloom gelatin 2.6 parts by weight sodium benzoate, 2.0 parts by weight potassium sorbate, 113.0 parts by weight sucrose and 400.0 parts by weight distilled water were combined and heated to about 65° C. until all ingredients were dissolved. A total of 70.0 parts by weight ethoxyquin were homogenized into the solution. A total of 217.0 parts by weight vitamin A acetate crystals were homogenized into the mixture and heated to about 65° C. The resulting emulsion was homogenized to a range of 1–3 micron and the pH thereof was adjusted to pH 8.0 with ammonium hydroxide.

A second solution was prepared by dissolving 12.5 parts by weight rapid set pectin (Stein-Hall) in 200 parts by weight boiling water. The pH of this solution was adjusted to pH 8.5 with ammonium hydroxide.

A third solution was prepared by dissolving 1.0 part by weight calcium chloride dihydrate in 5.0 parts by weight distilled water. The pH of this solution was adjusted to pH 8 with ammonium hydroxide.

The pectin solution was then added to the emulsion and the pH of the resulting emulsion was adjusted, if necessary, to pH 8.9 with ammonium hydroxide. The consistency of the emulsion was then adjusted to a proper consistency for spraying with distilled water.

The resulting emulsion was combined with the second solution, the whole was thoroughly mixed and spray dried utilizing conventional equipment. The thus-formed powder was water-insoluble, had a pH of 5.4–5.6 and a potency of 1,200,000 I.U. of vitamin A activity per gram.

EXAMPLE 2

An emulsion and calcium chloride solution prepared as in Example 1 were combined, mixed and formed into beadlets by the procedure described in U.S. Pat. No. 2,756,177. This procedure involves forming the emulsion into droplets by passing it through a revolving spray head and introducing the emulsion droplets into an agitated cloud or suspension in air of a cooled collecting powder fluidized bed. The apparatus employed in accomplishing this was the revolving spray head and rotating drum described in U.S. Pat. No. 2,756,177 and the collecting powder utilized consisted primarily of a free-flowing starch ester, resistant to water wetting, available under the trade name "Dry-Flo" and distributed by National Starch Products, Inc., New York, N.Y.

The vitamin A acetate-containing beadlets, thus obtained, were separated from the Dry-Flo by screening, following which they were dried to a moisture content of 2%–5%. The beadlets thus obtained were water-insoluble and had a pH of 5.4–5.8 and a vitamin A potency of 840,000 I.U. per gram.

EXAMPLE 3

For comparative purposes, beadlets were formed from the following formulation by the method described in U.S. Pat. No. 2,756,177.

| Ingredient: | Parts by weight |
| --- | --- |
| Sucrose | 20.0 |
| Gelatin | 40.0 |
| Distilled water | 85.0 |
| Ethoxyquin | 5.0 |
| Vitamin A palmitate | 20.0 |

EXAMPLE 4

Samples of the vitamin A acetate beadlets prepared in Example 2 and the vitamin A palmitate beadlets prepared in Example 3 were separately combined into standard chicken mash and trace mineral mix formulations. The formulations were stored under conditions of 45° C.

and 85% relative humidity for 3 weeks. The results of these stability tests are summarized in the following table.

TABLE

[Comparative stability at 45° C. and 85% R.H.; expressed as percent retention of potency]

| Beadlet | Chick mash | | Trace mineral mix | |
|---|---|---|---|---|
| | 10 days | 21 days | 10 days | 21 days |
| Vitamin A acetate, Ex. 2 | 97 | 74 | 97 | 87 |
| Vitamin A palmitate, Ex. 3 | 82 | 46 | 84 | 80 |
| Vitamin A acetate, Ex. 2 | 75 | 33 | 84 | 62 |
| Vitamin A palmitate, Ex. 3 | 79 | 44 | 84 | 76 |

The test results indicate that the vitamin A acetate beadlets prepared in accordance with Example 2 are at the very least comparable in stability to vitamin A palmitate in a matrix which does not contain calcium pectate. As it is recognized that vitamin A palmitate, although more stable to the acetate per se, is more expensive to produce, the stable vitamin A acetate formed in accordance with the invention is of significance from an economic viewpoint.

The increased stability of vitamin A acetate beadlets prepared in accordance with Example 2 is further illustrated by the results of stability tests conducted as above with vitamin A acetate beadlets prepared in accordance with Example 2 but omitting the calcium pectate. The results of these tests are as follows:

| Beadlet | Chick mash | | Trace mineral mix | |
|---|---|---|---|---|
| | 10 days | 21 days | 10 days | 21 days |
| Vitamin A acetate, Ca pectate | 97 | 74 | 97 | 87 |
| Vitamin A acetate, plain | 64 | 45 | 72 | 65 |

We claim:
1. A process for preparing stable, water-insoluble gelatin beadlets containing a vitamin A active substance comprising the steps of:
   (a) forming an emulsion of said vitamin A active substance in an aqueous solution of gelatin and adjusting the pH of said emulsion to between about pH 8 and 9;
   (b) combining said emulsion with an aqueous solution of pectin the pH of which is between about 8 and 9;
   (c) combining the emulsion formed in (b) with an aqueous solution of a water-soluble calcium salt the pH of which is between about pH 8 and 9;
   (d) introducing droplets of said emulsion into a mass of starchy powder thereby forming beadlets therefrom and concurrently forming calcium pectate in situ in the matrix of said beadlets;
   (e) separating the beadlets thus formed; and
   (f) drying the beadlets.
2. The process in accordance with claim 1 wherein said vitamin A active substance is vitamin A acetate.
3. A process in accordance with claim 2 wherein said emulsion formed in step (a) additionally contains a plasticizer and a pharmaceutically acceptable antioxidant.
4. A process in accordance with claim 3 wherein said water-soluble calcium salt is calcium chloride, said plasticizer is sucrose and said antioxidant is ethoxyquin.
5. A process for preparing a stable water-insoluble powder containing a vitamin A active substance comprising the steps of:
   (a) forming an emulsion of said vitamin A active substance in an aqueous solution of gelatin and adjusting the pH of said emulsion to between pH 8 and 9 with a volatile base;
   (b) combining the said emulsion with an aqueous solution of pectin the pH of which is between about pH 8 and 9;
   (c) combining the emulsion formed in (b) with an aqueous solution of a water-soluble calcium salt the pH of which is between about pH 8 and 9; and
   (d) spray drying said emulsion to form a powder comprising particles of said vitamin A active substance with a gelatin matrix thereby concurrently forming calcium pectate in situ in said matrix.
6. A process in accordance with claim 5 wherein said vitamin A active substance is vitamin A acetate.
7. The process in accordance with claim 6 wherein said emulsion formed in step (a) additionally contains a plasticizer and a pharmaceutically acceptable antioxidant.
8. A process in accordance with claim 7 wherein said water-soluble calcium salt is calcium chloride, said plasticizer is sucrose and said antioxidant is ethoxyquin.
9. An improved, water-insoluble gelatin beadlet prepared in accordance with the process of claim 1 characterized by being stable to acid pH and conditions of high temperature and relative humidity upon storage comprising a vitamin A active substance, gelatin and calcium pectate, said calcium pectate having been formed in situ in the matrix of said beadlet.
10. The improved beadlet in accordance with claim 9 wherein said vitamin A active substance is vitamin A acetate and said beadlet also contains a plasticizer and a pharmaceutically acceptable antioxidant.
11. An improved, spray-dried powder prepared in accordance with the process of claim 5 characterized by being stable to acid pH and high temperatures and relative humidity upon storage comprising particles of a vitamin A active substance, each particle being encased in a matrix comprising gelatin having dispersed therein calcium pectate, said calcium pectate having been formed in situ in said matrix.
12. The spray-dried powder of claim 11 wherein said calcium pectate is present in from about ½ to about 10% by weight and said vitamin A active substance is vitamin A acetate.

References Cited
UNITED STATES PATENTS

| 2,980,587 | 4/1961 | Tenham et al. | 424—344 X |
| 3,445,563 | 5/1969 | Clegg et al. | 424—344 X |
| 2,756,177 | 7/1956 | Cannolonga et al. | 424—344 X |
| 2,897,119 | 7/1959 | Dunn | 424—344 X |

SHEP K. ROSE, Primary Examiner